(12) United States Patent
Wallace et al.

(10) Patent No.: US 7,379,559 B2
(45) Date of Patent: May 27, 2008

(54) METHOD AND APPARATUS FOR DETERMINING AN OCCUPANT'S HEAD LOCATION IN AN ACTUATABLE OCCUPANT RESTRAINING SYSTEM

(75) Inventors: Jon K. Wallace, Redford, MI (US); Yun Luo, Ann Arbor, MI (US); Robert Dziadula, Farmington Hills, MI (US); Farid Khairallah, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 920 days.

(21) Appl. No.: 10/447,248

(22) Filed: May 28, 2003

(65) Prior Publication Data

US 2004/0240706 A1 Dec. 2, 2004

(51) Int. Cl.
*G06K 9/00* (2006.01)
(52) U.S. Cl. ............................ 382/100; 382/154; 701/1; 348/113
(58) Field of Classification Search ................ 382/100, 382/103, 107, 154, 165, 181, 199; 701/1, 701/36, 45; 340/907, 933; 348/113, 135
See application file for complete search history.

(56) References Cited

U.S. PATENT DOCUMENTS

| 4,625,329 A | 11/1986 | Ishikawa et al. |
| 4,805,225 A | 2/1989 | Clark |
| 5,008,946 A | 4/1991 | Ando |
| 5,060,278 A | 10/1991 | Fukumizu |
| 5,086,480 A | 2/1992 | Sexton |
| 5,330,226 A | 7/1994 | Gentry et al. |
| 5,398,185 A | 3/1995 | Omura |
| 6,005,598 A | 12/1999 | Jeong |
| 6,144,366 A | 11/2000 | Numazaki et al. |
| 6,324,453 B1 | 11/2001 | Breed et al. |
| 6,373,146 B2 * | 4/2002 | Horikoshi et al. ......... 307/10.1 |

(Continued)

OTHER PUBLICATIONS

Haddadinia et al., "An Efficient Human Face Recognition System Using Pseudo Zernike Moment Invariant and Radial Basis Function Neural Network", *International Journal of Pattern Recognition and Artificial Intelligence*, World Scientific Publishing, Singapore, SI, vol. 17, No. 1, Feb. 2003, pp. 41-62, XP001143954.

(Continued)

*Primary Examiner*—Samir Ahmed
*Assistant Examiner*—Anand Bhatnagar
(74) *Attorney, Agent, or Firm*—Tarolli, Sundheim, Covell & Tummino LLP (57) ABSTRACT

An apparatus (20) for determining a location of a person's head (90) includes stereo vision system (60) for imaging an area of interest such as the interior of a vehicle (26). The vision system provides an image signal of the area of interest. An analyzer (80) analyzes the image signal to identify head candidates (90', 210, 212, 214, 216) in the area of interest and provides data regarding any identified head candidates in the area of interest. A processor (80) processes the provided data regarding identified head candidates to locate the person's head. In an air bag restraining system (22), a controller (50) monitors the location of the person's head and controls an air bag (34) in response to a sensed crash condition (52) and the location of the person's head.

36 Claims, 9 Drawing Sheets

U.S. PATENT DOCUMENTS

| | | | |
|---|---|---|---|
| 6,393,133 | B1 | 5/2002 | Breed et al. |
| 6,422,595 | B1 | 7/2002 | Breed et al. |
| 6,724,920 | B1* | 4/2004 | Berenz et al. ............... 382/118 |
| 6,757,602 | B2* | 6/2004 | Breed et al. ................... 701/45 |
| 6,801,662 | B1* | 10/2004 | Owechko et al. ........... 382/224 |
| 2002/0085739 | A1 | 7/2002 | Ertl et al. |
| 2003/0036835 | A1 | 2/2003 | Breed et al. |
| 2004/0153229 | A1* | 8/2004 | Gokturk at al. ............... 701/45 |
| 2005/0129273 | A1* | 6/2005 | Pryor ......................... 382/103 |

OTHER PUBLICATIONS

Park et al., "Head Segmentation and Head Orientation in 3D Space for Pose Estimation of Multiple People", *IEEE Proc.* Southwest Symposium on Image Analysis and Interpretation (SSIAI 2000), Apr. 2, 2000, pp. 192-196, XP010378658.

Fitzpatrick, "Head Pose Estimation without Manual Initialization", XP002389268.

Clabian et al., "Head Detection and Localization from Sparse 3D Data", XP002389335.

Otsu, "A Threshold Selection Method from Gray-Level Histograms", *IEEE Transactions on Systems, Man Cybernetics*, vol. 9., No. 1, 1979, pp. 62-66, XP000617438.

Haritaoglu et al., "*Hydra*: Multiple People Detection and Tracking Using Silhouettes", Image Analysis and Processing, 1999. Proceedings. International Conference on Venice, Italy Sep. 27-29, 1999, Alamitos, CA, USA, IEEE Comput. Soc., US, 27 Sep. 27, 1999, pp. 280-285, XP010354287, ISBN: 0-7695-0040-4.

* cited by examiner

METHOD AND APPARATUS FOR DETERMINING AN OCCUPANT'S HEAD LOCATION IN AN ACTUATABLE OCCUPANT RESTRAINING SYSTEM

TECHNICAL FIELD

The present invention is directed to an actuatable restraining system and is particularly directed to a method and apparatus for locating and tracking an occupant's head position in an actuatable restraining system in a vehicle.

BACKGROUND OF THE INVENTION

Actuatable occupant restraining systems, such as an inflatable air bag, in vehicles are known in the art. Such systems that are controlled in response to whether the seat is occupied, an object on the seat is animate or inanimate, a reward facing child seat present on the seat, and/or in response to the occupant's position, weight, size, etc., are referred to as smart restraining systems.

One example of a smart actuatable restraining system is disclosed in U.S. Pat. No. 5,330,226.

SUMMARY OF THE INVENTION

In accordance with one exemplary embodiment of the present invention, an apparatus is provided for determining a location of a person's head. The apparatus comprises a vision system for imaging an area of interest and providing an image signal of the area of interest. An analyzer analyzes the image signal to identify head candidates in the area of interest and provides data regarding any identified head candidates. A processor processes the provided data regarding identified head candidates to locate the person's head.

In accordance with another exemplary embodiment of the present invention, an air bag restraining system is provided for helping to protect an occupant of a vehicle upon the occurrence of a vehicle crash event. The apparatus comprises an air bag restraining device for, when actuated, helping to protect the vehicle occupant. A crash sensor is provided for sensing a vehicle crash event and, when a crash event occurs, provides a crash signal. An air bag controller monitors the crash sensor and controls actuation of the air bag restraining device. A stereo vision system images an interior area of the vehicle and provides an image signal of the area of interest. A vision system controller is connected to the air bag controller and analyzes the image signal from the stereo vision system to identify head candidates in the interior of the vehicle, provides data regarding any identified head candidates, processes the provided data regarding identified head candidates to locate the occupant's head, and provides a signal indicative of the occupant's head location to the air bag controller The air bag controller controls actuation of the air bag restraining device in response to both the crash signal and the signal indicative of the location of the occupant's head.

In accordance with another exemplary embodiment of the present invention a method is provided for determining a location of a person's head comprising the steps of imaging an area of interest and providing an image signal of the area of interest, analyzing the image signal to identify head candidates in the area of interest and providing data regarding any identified head candidates, and processing the provided data regarding identified head candidates to locate the person's head.

In accordance with yet another exemplary embodiment of the present invention, a method for controlling an air bag restraining system to help protect an occupant of a vehicle upon the occurrence of a vehicle crash event, said method comprising the steps of providing an air bag restraining device for, when actuated, helping to protect the vehicle occupant, sensing a vehicle crash event and providing a crash signal upon the occurrence of a vehicle crash event, monitoring the crash sensor, imaging an interior area of the vehicle and providing an image signal of the area of interest, analyzing the image signal to identify head candidates in the interior of the vehicle, providing data regarding any identified head candidates, processing the provided data regarding identified head candidates to locate the occupant's head, providing a signal indicative of the occupant's head location, and controlling actuation of the air bag restraining device in response to both the crash signal and the signal indicative of the location of the occupant's head.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIGS. 8A-8D are flow charts depicting the head candidate algorithm in accordance with an exemplary embodiment of the present invention;

DESCRIPTION OF PREFERRED EMBODIMENT

Figure 1:
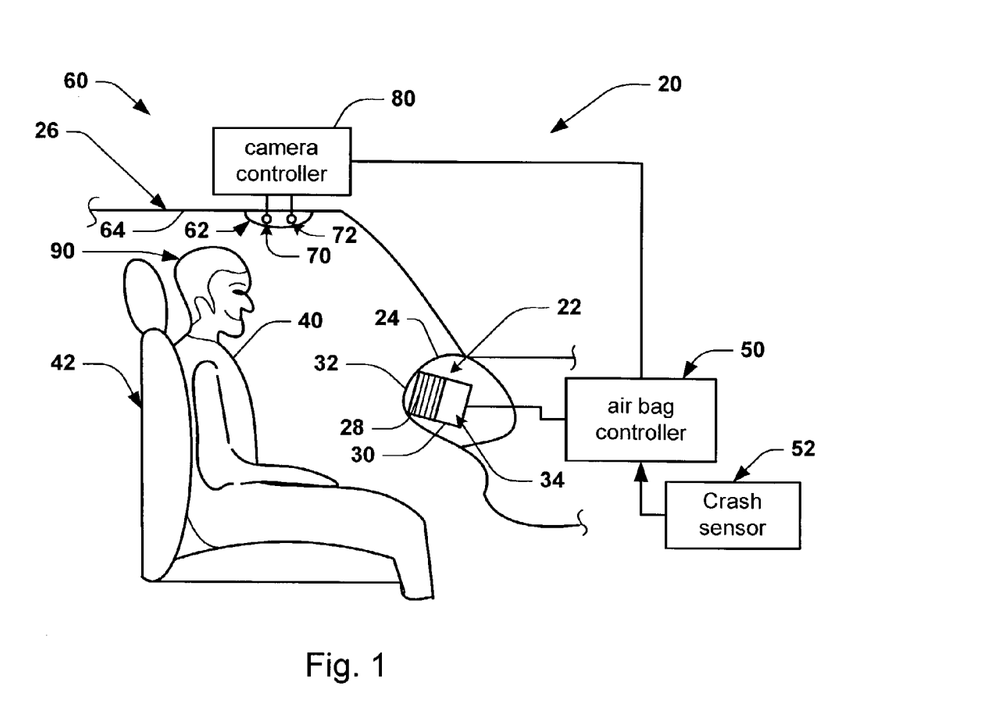
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 helps protect an occupant 40, such as the vehicle passenger, sitting on a vehicle seat 42. Although the invention is described with regard to a vehicle passenger, it is applicable to a vehicle driver and back-seat passengers and their associated actuatable restraining systems. The present invention is also applicable to the control of side actuatable restraining devices.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a crash analysis algorithm, determines if a deployment crash event is occurring, i.e., one for which it may be desirable to deploy the air bag 28. There are several known deployment crash analysis algorithms responsive to crash acceleration signal(s) that may be used as part of the present invention. Once the controller 50 determines that a deployment vehicle crash event is occurring using a selected crash analysis algorithm, and if certain other occupant characteristic conditions are satisfied, the controller 50 controls inflation of the air bag 28 using the gas control portion 34, e.g., timing, gas flow rate, gas pressure, bag profile as a function of time, etc.

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to indicate the location of the occupant's head 90 relative to the cover 32 of the air bag assembly 22.

Figure 2:
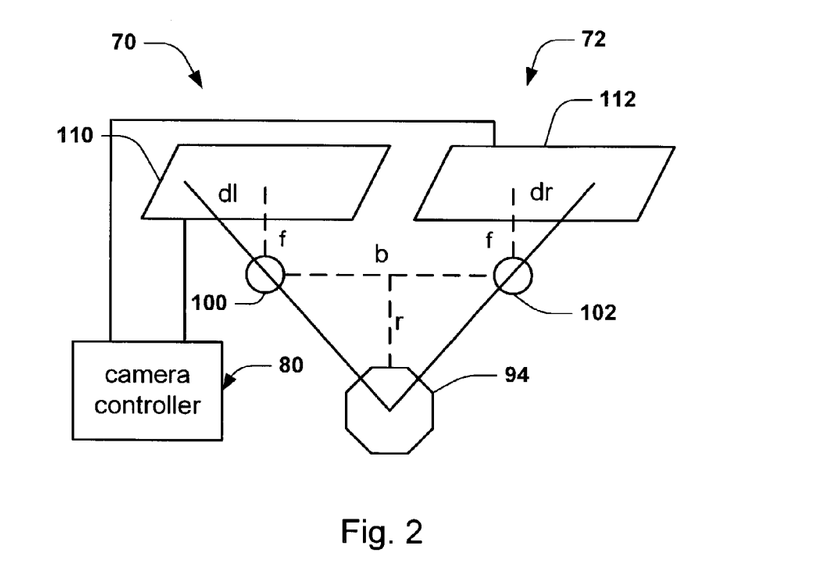
FIG. 2 is a schematic illustration of a stereo camera arrangement for use with the present invention for determining location of an occupant's head.

Referring to FIG. 2, the cameras 70, 72 may be of any several known types. In accordance with one exemplary embodiment, the cameras 70, 72 are charge-coupled devices ("CCD") or complementary metal-oxide semiconductor ("CMOS") devices. One way of determining the distance or range between the cameras and an object 94 is by using triangulation. Since the cameras are at different viewpoints, each camera sees the object at different position. The image difference is referred to as "disparity." To get a proper disparity determination, it is desirable for the cameras to be positioned and set up so that the object to be monitored is within the horopter of the cameras.

The object 94 is viewed by the two cameras 70, 72. Since the cameras 70, 72 view object 94 from different viewpoints, two different images are formed on the associated pixel arrays 110, 112, of cameras 70, 72 respectively. The distance between the viewpoints or camera lenses 100, 102 is designated "b". The focal length of the lenses 100 and 102 of the cameras 70 and 72 respectively, is designated as "f". The horizontal distance from the image center on the CCD or CMOS pixel array 110 and the image of the object on the pixel array 110 of camera 70 is designated "dl" (for the left image distance). The horizontal distance from the image center on the CCD or CMOS pixel array 112 and the image of the object 94 on the pixel array 112 for the camera 72 is designated "dr" (for the right image distance). Preferably, the cameras 70, 72 are mounted so that they are in the same image plane. The difference between dl and dr is referred to as the "image disparity," and is directly related to the range distance "r" to the object 94 where r is measured normal to the image plane. It will be appreciated that $$r=bf/d, \text{ where } d=dl-dr. \qquad \text{(equation 1)}$$

From equation 1, the range as a function of disparity for the stereo image of an object 94 can be determined. It should be appreciated that the range is an inverse function of disparity. Range resolution is a function of the range itself. At closer ranges, the resolution is much better than for farther ranges. Range resolution $\Delta r$ can be expressed as:

$$\Delta r=(r^2/bf)\Delta d \qquad \text{(equation 2)}$$

The range resolution, $\Delta r$, is the smallest change in range that is discernible by the stereo geometry, given a change in disparity of $\Delta d$.

Figure 3:
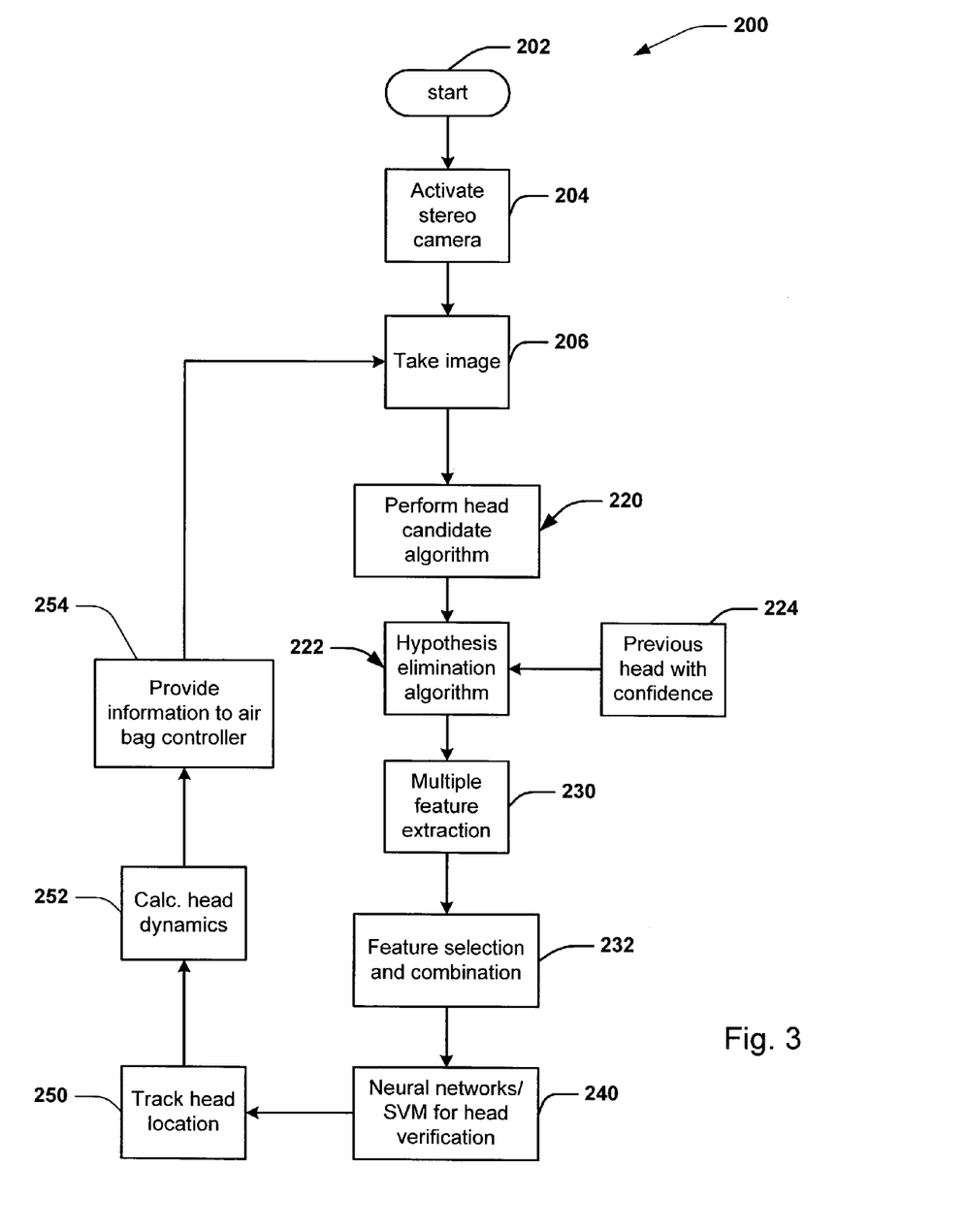
FIG. 3 is a flow chart showing a control process in accordance with an exemplary embodiment of the present invention.

Referring to FIG. 3, the control process 200, in accordance with one exemplary embodiment of the present invention, is shown. The process is initialized in step 202 in which internal memories are cleared, initial flag conditions are set, etc. This initialization can occur each time the vehicle ignition is started. In step 204, the stereo camera system 60 is activated. An image of the passenger seat location is take in step 206. As mentioned, the present invention is not only applicable to the passenger seat location, but is equally applicable to any seat location within the vehicle.

Figure 4:
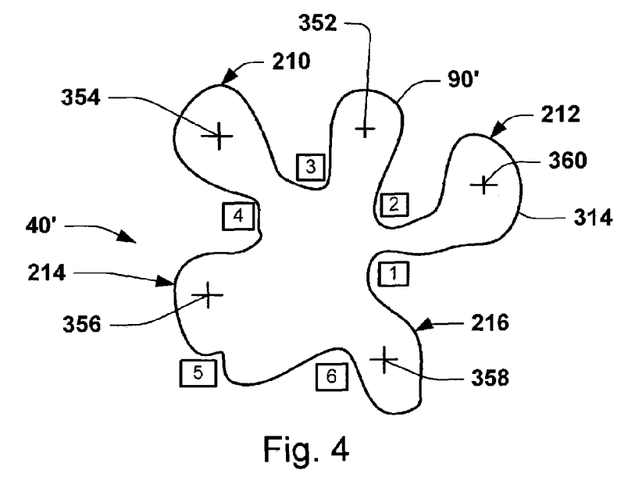
FIG. 4 is a schematic illustration of an imaged shape example analyzed in accordance with an exemplary embodiment of the present invention.

For the purposes of explanation, consider an example in which an occupant 40' depicted in FIG. 4 having a head 90'. In this example, the occupant is holding, in his right hand a manikin's head 210, and in his left hand, a soccer ball 212. The occupant's right knee 214 and his left knee 216 are also seen in FIG. 3. Each of the elements 90', 210, 212, 214, and 216 in this image by the cameras represent a potential occupant's head. The control process is to determine the actual occupant's head location, tack the head location, and control the actuatable restraining system 22 in response thereto. The occupant's head location is one of the control inputs.

Referring back to FIG. 3, the control process 200 performs a head candidate algorithm 220. The purpose of the head candidate algorithm 220 is to establish the location of all possible head candidates. In FIG. 3, the head candidate location algorithm will find and locate not only head 90'but also the manikin's head 210, the soccer ball 212, and knees 216, 216 as possible head candidate locations.

From step 220, the process 200 proceeds to step 222 where it performs a hypothesis elimination algorithm. The purpose of the hypothesis elimination algorithm is to eliminate certain identified head candidate locations in response to particular behavior of the head candidate. In effect, the hypothesis elimination algorithm is a filter to try and eliminate false head candidates. For example, if an identified head candidate's location should suddenly jump or move very quickly, e.g., a soccer ball is dropped from the occupant's hand, it is likely that the head candidate, i.e., the soccer ball is not a person's head. A previous value of head candidate confidence 224 can also is an input into the hypothesis elimination algorithm.

From step 222, the process proceeds to step 230 where a multiple feature extraction algorithm is performed. The multiple feature extraction algorithm 230 includes an incremental learning feature in which the algorithm continuously learns features of a head such as shape, grid features based on gray and disparity images, relative head location, visual feature extraction, and movement of the head candidate.

The process then proceeds to step 232 where feature selection and combination is performed. The algorithm attempts to find features that best discriminate heads from other objects. This is accomplished by combining the multiple features extracted in step 230.

In step 240, a neural network arrangement or support vector machine ("SVM") is used to establish a degree of confidence as to whether a head candidate is a true head. Approximately 200 features can be used to identify a head. These features are trained into the system 240 and include disparity features to determine depth and size information, gray scale features including visual appearance and texture, motion features including movement cues, and shape features that include contour and pose information. In step 240 a confidence value is determined for each head candidate equal to a value between 0% and 100%. The candidate with the highest confidence value is selected as the occupant's head in the field of view.

In step 250, the identified head candidate location is tracked. Head dynamics are calculated in step 252 and the head location and tracking information is provided to the air bag controller 50 in step 254. The process tracks the head location relative to a location in the previous image frame. The human head movement during a vehicle pre-braking condition is limited to speeds of less than 3.1 m/s without any external forces that could launch the head/torso at faster rates. The head tracker algorithm calculates a new head location relative to a previous head location. The algorithm uses the stereo camera distance measurement to calculate head location relative to the camera center axis. When the location information relative to the camera center of the axis is transferred to the air bag controller, the air bag controller "knows" the distance from the air bag door to the occupant's head since the distance between the air bag door and the camera center axis is known. This distance determination could instead be made by the camera controller.

The algorithm uses the stereo camera distance measurement to calculate any location in the field of view relative to the camera center axis. The algorithm geometrically triangulates and calculates distance between any two objects in the field of view of the camera. The algorithm calculates the trajectory of any moving and tracked object including the human head. The algorithm calculates the velocity and acceleration of any moving and tracked object including the human head. The algorithm evaluates the trajectory, velocity, and acceleration profile of any moving and tracked object and compares it to a predetermined profile. The algorithm compares a human trajectory, velocity, and/or acceleration profile to predetermined human occupant profiles and infers a probability number of the presence of absence of a human occupant in the passenger seat 42 of a vehicle 26. The process then loops back to step 206 where new images are continuously taken. The process repeats with the newly acquired images.

Figure 5:
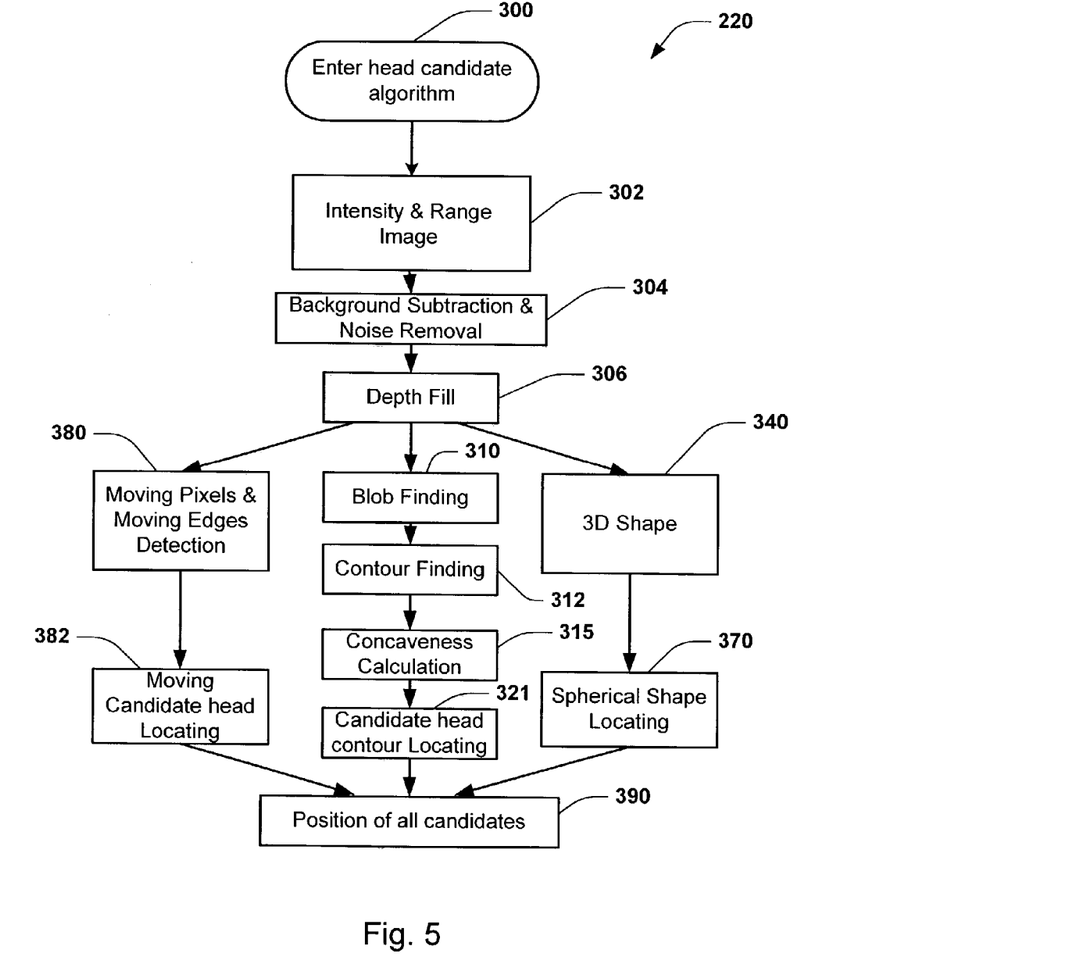
FIG. 5 is a flow chart showing a head candidate algorithm in accordance with an exemplary embodiment of the present invention.

Referring to FIG. 5, the head candidate algorithm 220 will be appreciated. Although serial and parallel processing is shown, the flow chart is given for explanation purposes only and the order of the steps and the type of processing can vary from that shown. The head candidate algorithm is entered in step 300. To determine if a potential head exists, the stereo camera 62 takes a range image and the intensity and the range of any object viewed is determined in step 302. The Otsu algorithm [Nobuyuki Otsu, "A Threshold Selection Method from Gray-Level Histograms," IEEE Transactions on Systems, Man, and Cybernetics, Vol. 9, No.1, pp. 62-66, 1979] is used to obtain a binary image of an object with the assumption that a person of interest is close to the camera system. Large connected components in the binary image are extracted as a possible human body.

Images are processed in pairs and the disparity map is calculated to derive 3D information about the image. Background information and noise are removed in step 304. In step 306, the image that appears from processing of the image pairs from the stereo camera is depth filled so as to remove discontinuities of the image. Such discontinuations could be the result of black hair or non-reflective material worn by the occupant.

In step 310, a blob finding process is performed to determine a blob image such as that shown in FIG. 4. In the blob finding process, all pixels that have an intensity value equal to or greater than a predetermined value are considered to be ON-pixels and those having an intensity value less than the predetermined value are considered to be OFF-pixels. A run/length coding is used to group all the ON-pixels together to establish one or more blobs within the viewing area. Then, the largest blob area is selected for further processing by the contour based candidate generation process.

In FIG. 4, the blob image depicts an example of the contour finding algorithm 312. Specifically, a blob image is taken by the stereo cameras 62 and the background subtracted. A contour line 314 is the result of this processing.

Figure 6:
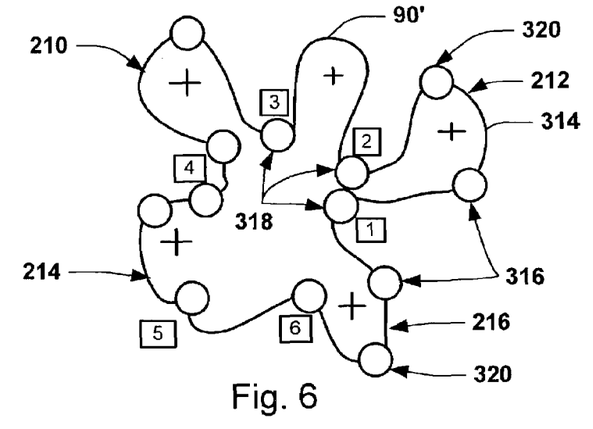
FIGS. 6 and 7 are schematic illustrations of imaged shape examples analyzed in accordance with an exemplary embodiment of the present invention.

Referring to FIGS. 5 and 6, turning point locations are identified on the body contour defined by line 314. The turning point locations are determined by finding concaveness of the shape of the body contour line 314 in the process step 315 (FIG. 5). There is a likely-hood of a head candidate being located between adjacent locations of concaveness along the body contour 314. A plurality of circle areas 316, each having a predetermined diameter and each having its associated center on the contour line 314, are evaluated to determine the concaveness of the contour shape. If a particular circle area being evaluated includes more ON-pixels than OFF-pixels, then that location on the contour line 314 is considered to be concave. Assume, for example, that the radius of each circle area being evaluated is r. The center of the circle at every contour point (x, y) and the concaveness around that area of pixel (x,y) is calculated as follows:

$$\text{Concaveness}(x, y) = \sum_{i,j,(i^2+j^2) \le r^2} I(x+i, y+j) \Big/ \pi r^2$$

where I(x, y) is a binary image with ON-pixels equal to 1 and background or OFF-pixels equal to 0.

The points with large concaveness values represent possible turning points on a body contour line 314. In FIG. 6, evaluation of circles 318 each yield a result that their associated locations are concave. Evaluation of circles 320 each yield a result that their associated locations are convex. After the evaluation of the entire contour shape 314, six areas of concaveness (identified in the square boxes labeled 1-6) are classified as turning points in this example and possible head candidate locations.

Figure 7:
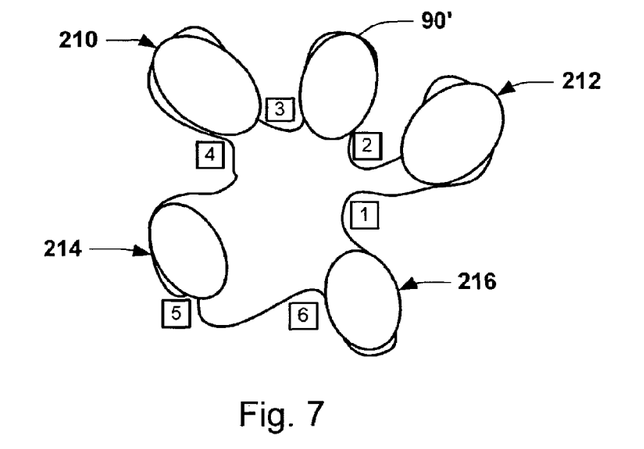

A head candidate locating process is performed in step 321 (FIG. 5). Referring to FIG. 7, for each pair of consecutive turning points 1-6, an ellipse fitting process is performed. If a contour segment connected by two consecutive turning points has a high fitting to an ellipse, it is considered a head candidate. As can be seen in FIG. 7, each of the locations 90', 210, 212, 214, and 216 have good ellipse fits and, therefore, each are considered possible head candidate locations. There are several advantages of using ellipse to fit the head: (1) the shape of human head is more like an ellipse than other shapes and (2) the ellipse shape can be easily represented by parameters including the center coordinates (x,y), the major/minor axis (a, b) and orientation (θ). The position (center) of the ellipse is more robust to contour. From these parameters of the ellipse, the size of the ellipse (which represents the size of the head), and the orientation of the ellipse (which is defined as the orientation of the head) can be determined.

To calculate ellipse features, the second order central moments method is used. These can be represented mathematically as follows:

$$\theta = \frac{1}{2}\tan^{-1}\left(\frac{2\mu_{1,1}}{\mu_{0,2}-\mu_{2,0}}\right), a = 4\sqrt{\frac{4\sqrt{\mu_{2,0}^3}}{\pi\sqrt{\mu_{0,2}}}}, b = 4\sqrt{\frac{4\sqrt{\mu_{0,2}^3}}{\pi\sqrt{\mu_{0,2}}}}.$$

Based on these parameters, the following ellipse features can be calculated:
1) Length of major axis: a
2) Length of minor axis: b
3) Orientation of the major axis of the ellipse: θ
4) Ratio of Minor axis by Major axis: r
5) Length of head contour: perimeter
6) Size of the head: area $$\text{Arperat} = \frac{\sqrt{\text{area}}}{\text{perimeter}} \qquad 7)$$

The human head from infant to full adult varies by 25% in volume or perimeter. The human head size varies between a minimum and a maximum value. A head size that is outside the typical human profile is rejected as a candidate human head.

Referring back to FIG. 5, a 3D shape is determined in step 340 using a hill climbing algorithm to find all areas that have a local maxima. For a pixel (x, y) in a range image, its depth value (i.e., distance from cameras) is compared with its neighbor pixels. If its neighbor pixels have higher intensity values, which means they are closer to the cameras, the process then moves to that pixel location that has the highest intensity which is closest to the cameras. This process continues until a pixel value is found that has the disparity value larger than any of its neighbors. The neighborhood is an area of pixels being monitored or evaluated. In FIG. 4, locations 352, 354, 356, 358, and 360 marked by crosses have a local maxima found by the hill climbing algorithm and are identified at spherical shapes locations in step 370. As can be seen in FIG. 4, the manikin's head 210, the soccer ball 212, and the occupant's knees 214, 216 all have a similar spherical shapes as the true head 90' and all are possible head candidates.

In step 380, moving pixels and moving edges are detected. To detect moving pixels, temporal edge movements are detected. The stationary objects are then distinguished from the moving occupants. 2D movement templates are combined with the 3D images to filter the shadow effects on determined movements. There is a high probability of having head/torso candidates in the moving portion of the image, i.e., a person's head will not remain stationary for a long period of time.

It assumed that a large portion of the objects of interest are moving, whereas the background is static or stabilized. Although, in general, a motion feature alone is not enough to detect human body, it can be a very useful supporting feature to recognize the presence of a person if he or she is moving. Global and local motion analysis is used in step 382 to extract motion features.

In global motion analysis, every two adjacent image frames are subtracted to calculate the number of all moving pixels. The difference image from two consecutive frames in a video sequence removes noise such as range information drop out and disparity calculation mismatch. Therefore, the result yields a good indication of whether there is a moving object in the imaged area.

The vertical and horizontal projections of the difference image are calculated to locate concentrations of moving pixels. The concentrated moving pixels usually correspond to fast moving objects such as the moving head or hand. The process searches for peaks of movement in both the horizontal and vertical directions. The location (x,y) of the moving object is chosen that corresponds to the peaks from the horizontal movement of pixels and the peak from the vertical movement of pixels, These (x, y) locations are considered as a possible head candidate locations.

From the head candidate locations identified in steps 321, 370, and 382, the position of all candidates are identified in step 390. The process then returns and proceeds to step 222 in FIG. 3.

Referring to FIGS. 8A-8D, a more detailed representation of the head candidate algorithm 220 is shown. Numeric designation of the process steps may be different or the same as that shown in FIG. 5. Specifically referring to FIG. 8A, the head candidate algorithm is entered in step 300. Images are monitored in step 402 and the monitor image intensity is determine from 2D images in step 404. In step 406, a 3D of the image is computed from the 2D intensity image. In step 408, the image range is determined. The background is subtracted out in step 306 and the noise is removed. The depth fill process is carried out in step 306. The depth filed fills in intensity values to correct for discontinuities in the image that are clearly erroneous.

The process 220 then branches into three candidate generation processes including the contour based candidate generation 410 (corresponding to steps 310, 312, 315, and 321 in FIG. 5), the 3D spherical shape candidate generation 412 (corresponding to steps 340 and 370 in FIG. 5), and the motion based candidate generation 414 (corresponding to steps 380 and 382 in FIG. 5).

Figure 8A:
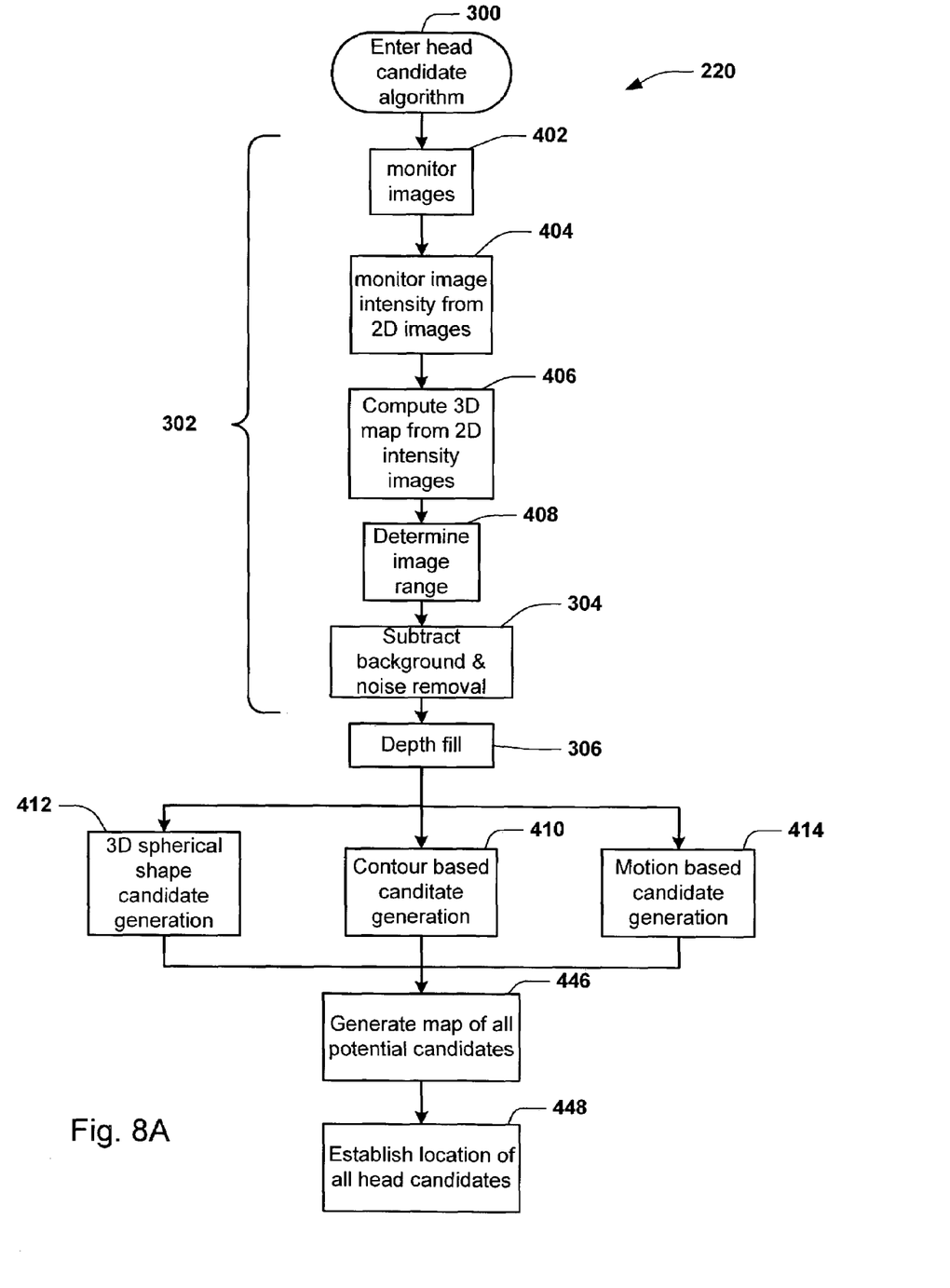
Figure 8B:
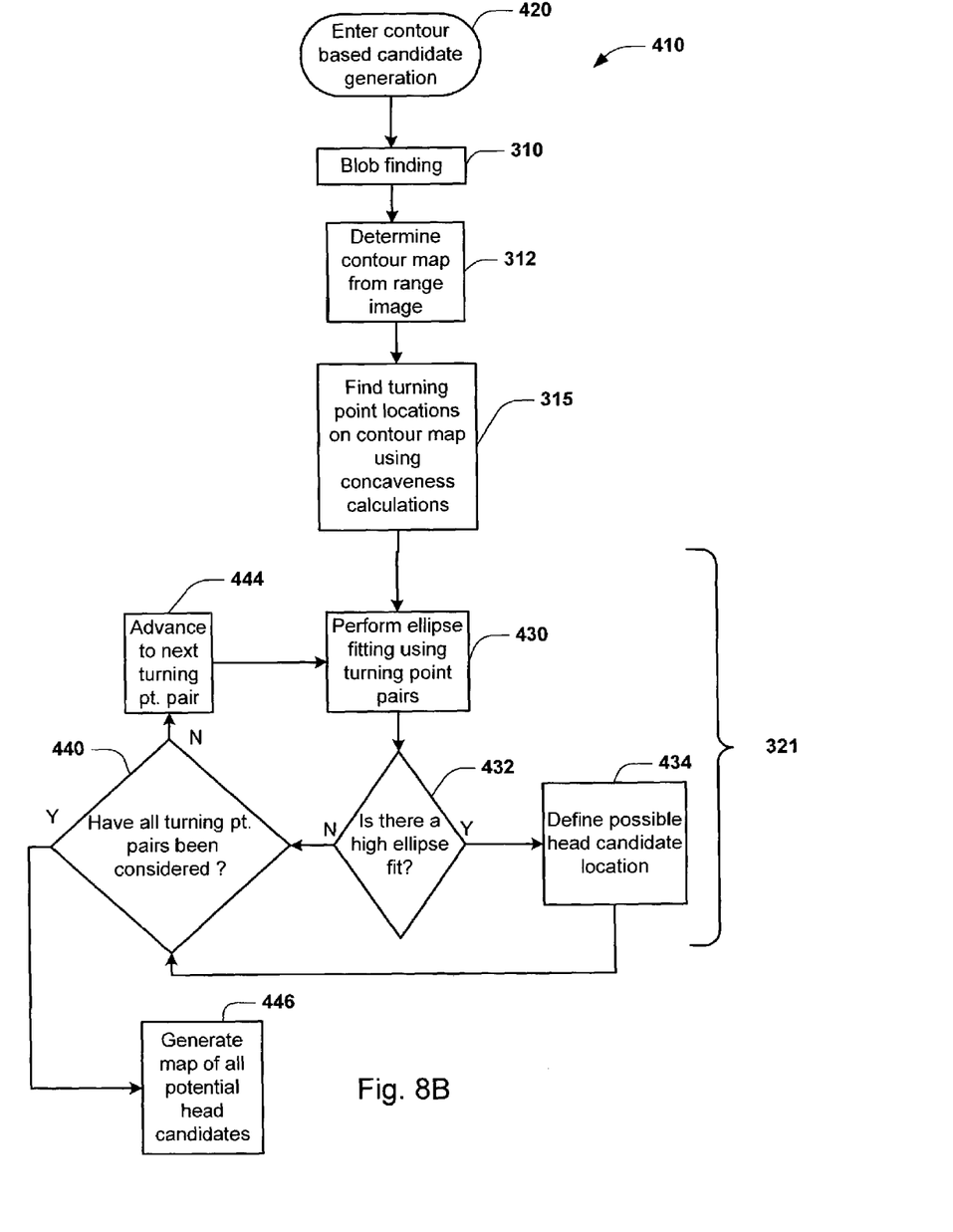

Referring to FIG. 8B, the contour based candidate generation is entered at 420. In step 310, the blob finding process is carried out. As described above, in the viewing area, all pixels that have a predetermined or greater intensity value are considered to be ON-pixels and those having an intensity value less than the predetermined value are considered to be OFF-pixels. A run/length coding is used to group all the ON-pixels together to establish one or more blobs within the viewing area. Then, the largest blob area is selected for further processing by the contour based candidate generation process 410.

In step 312, the contour map for the largest determined blob is determined from the range image. In step 315, the turning point locations on the contour map are determined using the concaveness calculations. The candidate head contour locating process 321 includes performing an ellipse fitting process carried out between adjacent turning point pairs in step 430. In step 432, a determination is made as to whether there is a high ellipse fit. If the determination in step 432 is affirmative, the process defines that location as a possible head candidate locations in step 434. From step 434 or a negative determination in step 432, the process proceeds to step 440 where a determination is made as to whether all turning point pairs have been considered for ellipse fitting. If the determination in step 440 is negative, the process proceeds to step 444 where the process advances to the next turning point pair for ellipse fitting analysis and then loops back to step 430. If the determination in step 440 is affirmative, the process proceeds to step 446 where a map of all potential head candidates are generated based on the results of the processes of steps 410, 412, and 414.

Figure 8C:
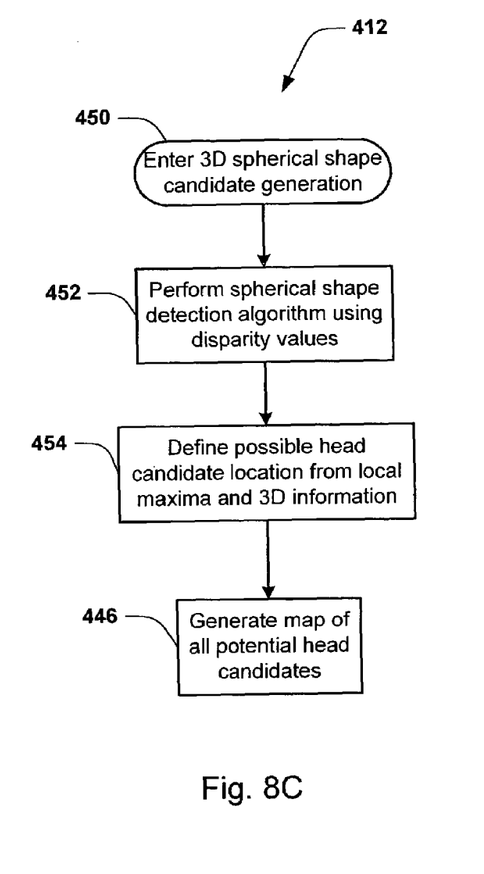

Referring to FIG. 8C, the 3D spherical shape candidate generation will be better appreciated. The process is entered at step 450 and the spherical shape detection algorithm is performed using disparity values in step 452. All possible head candidate locations are defined from the local maxima and 3D information obtained from the hill climbing algorithm in step 454. The maps of all potential head candidates are generated in step 446.

Figure 8D:
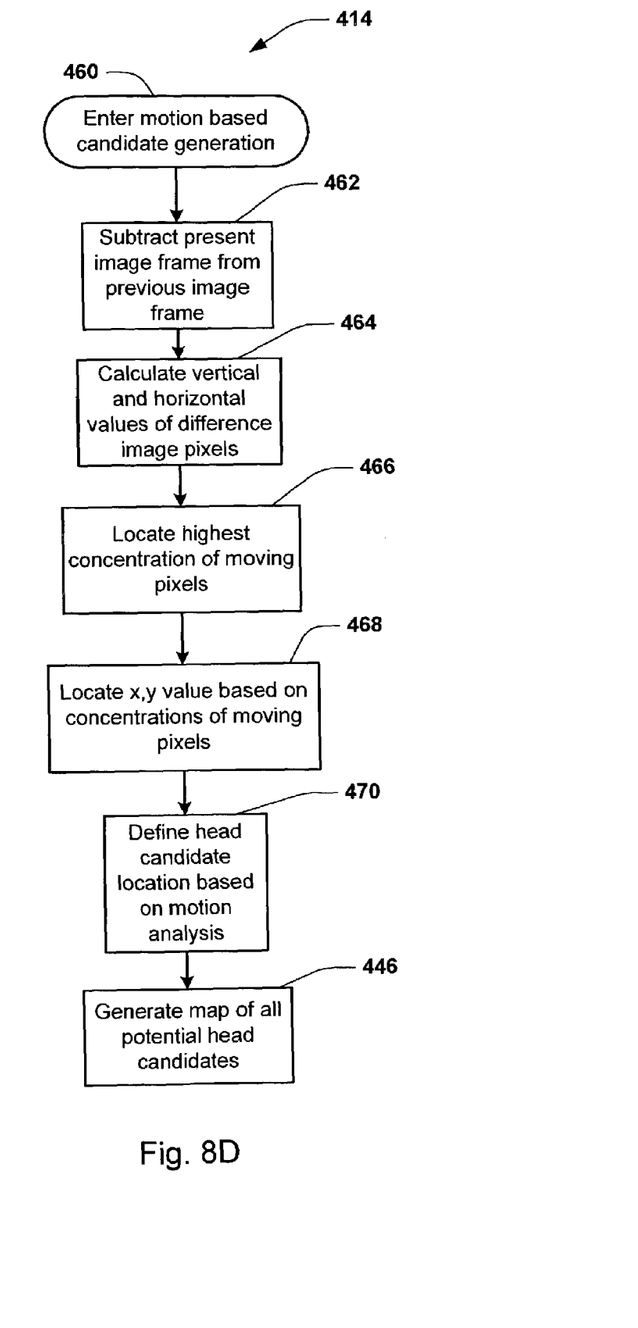

Referring to FIG. 8D, the motion based candidate generation 414 will be better appreciated. The process is entered in step 460. In step 464, the present image frame is subtracted from the previous image. The vertical and horizontal values of difference image pixels are calculated in step 464. In step 466, the highest concentration of moving pixels is located and the (x, y) values based on the concentrations of moving pixels are located in step 468. The head candidate location based on motion analysis is performed in step 470. The map of all potential head candidates is generated in step 446.

Figure 9:
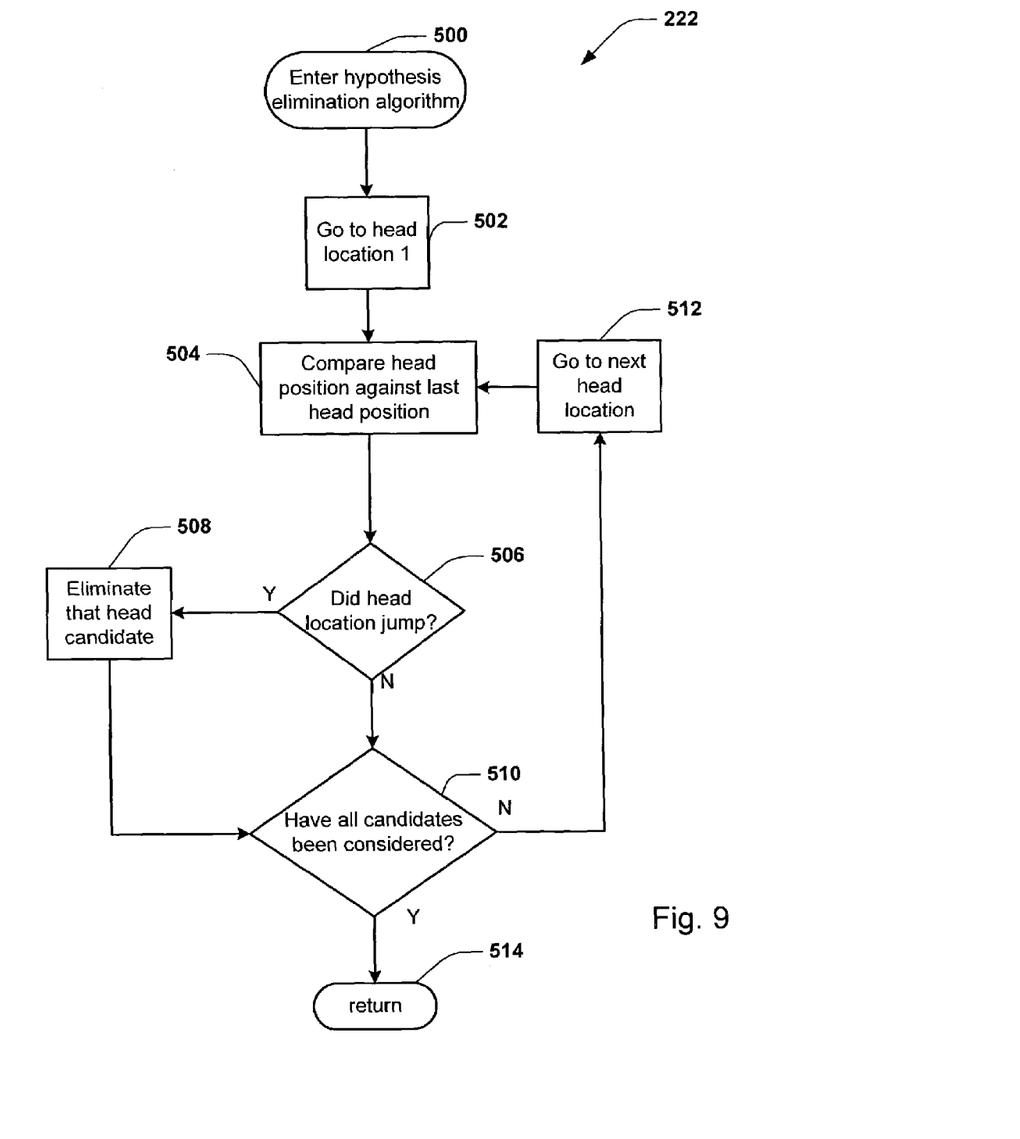
FIG. 9 is a flow chart depicting a hypothesis elimination algorithm in accordance with an exemplary embodiment of the present invention.

Referring to FIG. 9, the hypothesis elimination algorithm 222 will be better appreciated. The process is entered at step 500. In step 502, to process considers the first determined head candidate location. In step 504, the head position is compared against the last determined head position. A determination is then made in step 506 as to whether the head location jumped in position, i.e., a rapid change in head location that would not be expect of a true head. The head movement limit is computed from the system frame rate per second and a pre-braking maximum possible head movement at 1 g deceleration. If the determination in step 506 is affirmative, that location is eliminated as being a possible head candidate. From step 508 or a negative determination in step 506, a determination is made in step 510 as to whether all head candidate locations have been considered. If the determination in step 510 is negative, the process proceeds to step 512 where the system advances to the next head location before looping back to step 504. If the determination in step 510 is affirmative, the process returns in step 514 to proceed to step 230.

Figure 10:
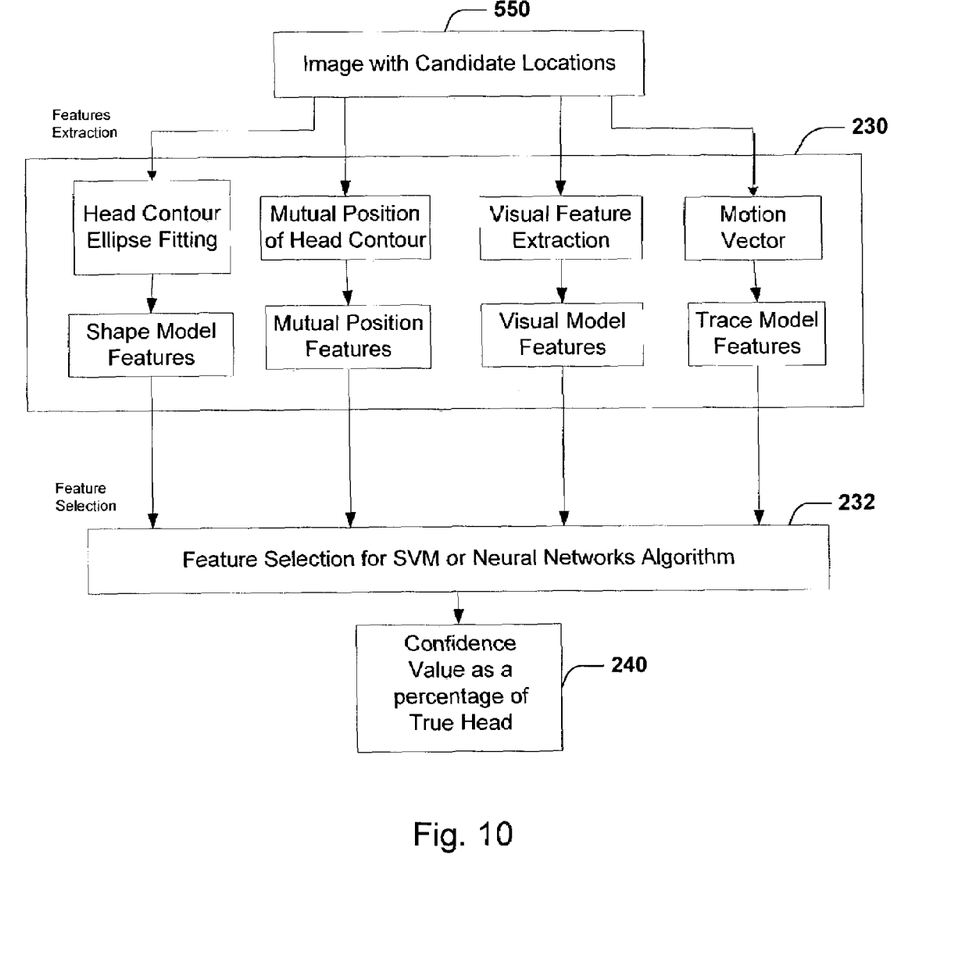
FIG. 10 is a diagram illustrating a feature extraction and selection algorithm in accordance with an exemplary embodiment of the present invention.

Referring to FIG. 10, the feature extraction, selection and head verification process (i.e., steps 230, 232, and 240) will be better appreciated. The image with the candidate locations 550 after hypothesis elimination is provided to the feature extraction process of step 230. For head detection, a Support Vector Machine ("SVM") algorithm and/or a Neural Network ("NN") learning based algorithm are used to classify the true head from the false head in the head candidate pool. In order to make the SVM and/or NN system effective, it is extremely important to find features that can best discriminate heads from other objects.

The SVM based algorithm is used with an incremental learning feature design. Support Vector Machine based algorithm, in addition to its capability to be used in a supervised learning applications, is designed to be used in an incremental learning mode. The incremental learning feature enables the algorithm to continuously learn after it is fielded to accommodate any new situations and/or new system mission profiles.

The following features, head shape descriptors, grid features of both gray and disparity images, relative head location, and head movements improve the probability of finding and tracking a true occupant head. Other types of features are statistic features extracted from gray and disparity images using a grid structure. The following statistic features are extracted from each grid area:

$$\text{Average Intensity: } \bar{I} = \frac{\sum_{i=1}^{n} I_i}{n} \quad 1)$$

$$\text{Variance of average gray scale: } \sigma = \sqrt{\frac{\sum_{i=1}^{n} (I_i - \bar{I})^2}{n-1}} \quad 2)$$

$$\text{Coarseness: } Co = \sum_{(x,y) \in Region} C(x, y) \quad 3)$$

The coarseness is used to represent the texture.

The relative head location is measured by the length and orientation of the head-body vector that connects the centroid of the body contour and the centroid of the head candidate contour. The head-body vector gives a clue of what the person's stance appears to be. The vector can measure whether a person is straight-up or is lying down. If the head-body vector indicates that the head is far below the body position, we can eliminate this as a head candidate.

Motion vector, (d, θ) or (dx, dy) of the head is used to represent the head moving patterns. Head movement usually follows certain patterns such as a smooth and continuous trajectory between consecutive frames. Therefore, the head location can be predicted based on its previous head movement. Six dimensional head trace features are extracted, $M\_V=\{x_i^t, y_i^t, dx_i^t, dy_i^t, dx^{(t-1)}, dy^{(t-1)}\}$, to represent the head candidate moving patterns. These trace features indicate the current and previous location of the candidate head and the information of how far the candidate head has moved. The multiple features are then provided for feature selection and classification.

Important features that can be used to discriminate true head from other candidates include intensity, texture, shape, location, ellipse fitting, gray scale visual features, mutual position and motion.

The SVM algorithm or the Neural Network algorithm will output a confidence value between 0 and 1 (0% to 100%) as to how close the candidate head features compare to pre-programmed true head features. The head candidate with the highest confidence value is selected as the most likely true head in the field of view. In addition, the mutual position of the candidate in the whole body object is also very important. The Support Vector Machine SVM Algorithm and/or a Neural Networks NN algorithm requires training of a data base. Head images and non-head images are required to teach the SVM algorithm and/or Neural Network the features that belong to a human head and the head model.

From the above description of the invention, those skilled in the art will perceive improvements, changes and modifications. Such improvements, changes and modifications within the skill of the art are intended to be covered by the appended claims.

The invention claimed is:

1. An apparatus for determining a location of a person's head, said apparatus comprising:
   a vision system for imaging an area of interest and providing an image signal of the area of interest;
   an analyzer for analyzing the image signal to identify a plurality of head candidates in the area of interest and for providing data regarding the plurality of head candidates, the provided data comprising at least one of the size, shape, and texture of each of the plurality of the head candidates; and
   a processor for processing the provided data regarding each of the identified head candidates to determine which of the plurality of head candidates represents the person's head.

2. The apparatus of claim 1 wherein the vision system includes a stereo camera.

3. The apparatus of claim 1 wherein the analyzer includes means for computing head size.

4. The apparatus of claim 1 wherein the processor includes means for filtering shadow effects using 2D templates and 3D images.

5. The apparatus of claim 1 wherein said analyzer includes means for performing a head candidate algorithm using the image signal to identify the head candidates in the area of interest.

6. The apparatus of claim 5 wherein said analyzer further includes means for determining position of the identified head candidates.

7. The apparatus of claim 5 wherein said means for performing the head candidate algorithm includes first determining means for determining a blob image from the image signal.

8. The apparatus of claim 7 wherein said means for performing the head candidate algorithm further includes second determining means for determining a contour of the blob image and establishing a contour image in response thereto.

9. The apparatus of claim 8 wherein said means for performing the head candidate algorithm further includes third determining means for determining turning point locations of the contour image.

10. The apparatus of claim 9 wherein said means for performing the head candidate algorithm further includes means for performing an ellipse fitting algorithm for determining the quality of ellipse fits of the contour image between determined turning point locations.

11. The apparatus of claim 5 wherein said means for performing the head candidate algorithm includes means for determining at least two of a 3D spherical shape head candidate, a contour based head candidate, and a motion based head candidate from the image signal.

12. The apparatus of claim 1 wherein said processor includes means for performing a hypothesis elimination algorithm to filter identified head candidates and locate the person's head.

13. The apparatus of claim 1 wherein said processor includes means for modeling multiple head features including at least one of motion and moments to determine which of the plurality of head candidates represents the person's head.

14. The apparatus of claim 1 wherein the analyzer includes means for performing a hill climbing algorithm on the image signal to identify any of said head candidates.

15. The apparatus of claim 1 wherein said processor includes at least one of a neural network and support vector machine to verify an identified head candidate as the person's head.

16. The apparatus of claim 1 further including means for tracking the position of the person's head.

17. The apparatus of claim 1 further including an air bag and means for controlling the air bag in response to the location of the person's head.

18. An air bag restraining system for helping to protect an occupant of a vehicle upon the occurrence of a vehicle crash event, said apparatus comprising:
   an air bag restraining device for, when actuated, helping to protect the vehicle occupant;
   crash sensor for sensing a vehicle crash event and, when a crash event occurs, providing a crash signal;
   air bag controller for monitoring the crash sensor and controlling actuation of the air bag restraining device;
   a stereo vision system for imaging an interior area of the vehicle and providing an image signal of the area of interest; and
   a vision system controller connected to the air bag controller for analyzing the image signal from the stereo vision system to identify a plurality of head candidates in the interior of the vehicle, for providing data regarding the plurality of head candidates, the provided data comprising at least one of the size, shape, and texture of the head candidate;
   processing the provided data regarding each of the plurality of head candidates to determine which of the plurality of head candidates represents the occupant's head, and providing a signal indicative of the occupant's head location to the air bag controller;
   the air bag controller controlling actuation of the air bag restraining device in response to both the crash signal and the signal indicative of the location of the occupant's head.

19. A method for determining a location of a person's head, said method comprising the steps of:
   imaging an area of interest and providing an image signal of the area of interest;
   analyzing the image signal to identify a plurality of head candidates in the area of interest and providing data regarding the plurality of head candidates, the provided data comprising at least one of the size, shape, and texture of each of the plurality of the head candidates; and
   processing the provided data regarding each of the plurality of head candidates to determine which of the plurality of head candidates represents the person's head.

20. The method of claim 19 wherein the step of imaging system includes using a stereo camera.

21. The method of claim 19 wherein the step of analyzing the image signal includes computing head size.

22. The method of claim 19 wherein the step of processing includes filtering shadow effects using 2D templates and 3D images.

23. The method of claim 19 wherein the step of analyzing includes performing a head candidate algorithm using the image signal to identify the head candidates in the area of interest.

24. The method of claim 23 wherein the step of analyzing further includes the step of determining position of the identified head candidates.

25. The method of claim 23 wherein the step of performing the head candidate algorithm includes determining a blob image from the image signal.

26. The method of claim 25 wherein the step of performing the head candidate algorithm further includes determining a contour of the blob image and establishing a contour image in response thereto.

27. The method of claim 26 wherein the step of performing the head candidate algorithm further includes determining turning point locations of the contour image.

28. The method of claim 27 wherein the step of performing the head candidate algorithm further includes performing an ellipse fitting algorithm for determining the quality of ellipse fits of the contour image between determined turning point locations.

29. The method of claim 23 wherein the step of performing the head candidate algorithm includes determining at least two of a 3D spherical shape head candidate, a contour based head candidate, and a motion based head candidate from the image signal.

30. The method of claim 19 wherein step of processing includes performing a hypothesis elimination algorithm to filter identified head candidates and locate the person's head.

31. The method of claim 19 wherein the step of processing includes modeling multiple head features including at least one of motion and moments and to determine which of the plurality of head candidates represents the person's head.

32. The method of claim 19 wherein the step of analyzing includes performing a hill climbing algorithm on the image signal to identify any of the head candidates.

33. The method of claim 19 wherein the step of processing includes using at least one of a neural network and support vector machine to verify and identified head candidate as the person's head.

34. The method of claim 19 further including the step of tracking position of the person's head.

35. The method of claim 19 further including the steps of providing an air bag restraining device and controlling the air bag restraining device in response to the location of the person's head.

36. A method for controlling an air bag restraining system to help protect an occupant of a vehicle upon the occurrence of a vehicle crash event, said method comprising the steps of:

providing an air bag restraining device for, when actuated, helping to protect the vehicle occupant;

sensing a vehicle crash event and providing a crash signal upon the occurrence of a vehicle crash event;

monitoring the crash sensor;

imaging an interior area of the vehicle and providing an image signal of the area of interest;

analyzing the image signal to identify a plurality of head candidates in the interior of the vehicle, for providing data regarding the plurality of head candidates, the provided data comprising at least one of the size, shape, and texture of each of the plurality of the head candidates;

providing data regarding any identified head candidates;

processing the provided data regarding each of the plurality of head candidates to determine which of the plurality of head candidates represents the occupant's head;

providing a signal indicative of the occupant's head location;

controlling actuation of the air bag restraining device in response to both the crash signal and the signal indicative of the location of the occupant's head.

* * * * *